US007307663B2

(12) United States Patent
Pokrovsky et al.

(10) Patent No.: US 7,307,663 B2
(45) Date of Patent: Dec. 11, 2007

(54) VIDEO SURVEILLANCE CAMERA

(75) Inventors: Alex Pokrovsky, Fresno, CA (US); Thomas Lyon, Clovis, CA (US); Erik Tews, Fresno, CA (US); Mark J. Johnson, Livermore, CA (US)

(73) Assignee: Pelco, Clovis, CA (US)

( * ) Notice: Subject to any disclaimer, the term of this patent is extended or adjusted under 35 U.S.C. 154(b) by 694 days.

(21) Appl. No.: 10/942,621

(22) Filed: Sep. 16, 2004

(65) Prior Publication Data

US 2006/0055819 A1    Mar. 16, 2006

(51) Int. Cl.
*H04N 5/232* (2006.01)
(52) U.S. Cl. .................. 348/373; 34/357; 396/144
(58) Field of Classification Search ........ 348/373–377, 348/143–161, 340; 396/419–428, 535, 72–152
See application file for complete search history.

(56) References Cited

U.S. PATENT DOCUMENTS

| | | | |
|---|---|---|---|
| 5,032,919 A * | 7/1991 | Randmae .................. 348/345 |
| 5,555,051 A * | 9/1996 | Maruyama et al. ......... 396/144 |
| 5,583,602 A * | 12/1996 | Yamamoto .................. 396/133 |
| 5,708,886 A * | 1/1998 | Hayashi ..................... 396/379 |
| 5,825,559 A * | 10/1998 | Johnson et al. ............ 359/819 |
| 5,930,544 A * | 7/1999 | Tseng et al. ................ 396/529 |
| 6,788,891 B1 * | 9/2004 | Mitsugi ...................... 396/144 |
| 6,867,812 B2 * | 3/2005 | Iiizumi et al. ............. 348/374 |
| 6,909,464 B2 * | 6/2005 | Nomura et al. ............ 348/357 |
| 2003/0107668 A1 * | 6/2003 | Yamamoto .................. 348/357 |

OTHER PUBLICATIONS

CCC1300H-2, CCC1300H-2X, and MCC1300H-2, 1/3-Inch CCD Installation/Operation Manual C1961M-B(3/01): Pelco.

* cited by examiner

*Primary Examiner*—David Ometz
*Assistant Examiner*—Pritham D. Prabhakher
(74) *Attorney, Agent, or Firm*—Paul T. Kashimba

(57) ABSTRACT

A video surveillance camera comprising a lens, lens holder, image sensor, base, and ring. The base has a plurality of slots, and the image sensor is mounted on the base. The lens is positioned in the lens holder, which has a plurality of arms with a pin. Each of the arms is positioned so that its respective pin is located in one of the plurality of slots in the base. The ring has a plurality of grooves for engagement with the pins and is rotatably engaged with the base such that rotation of the ring imparts axial movement to the lens relative to the image sensor.

16 Claims, 3 Drawing Sheets

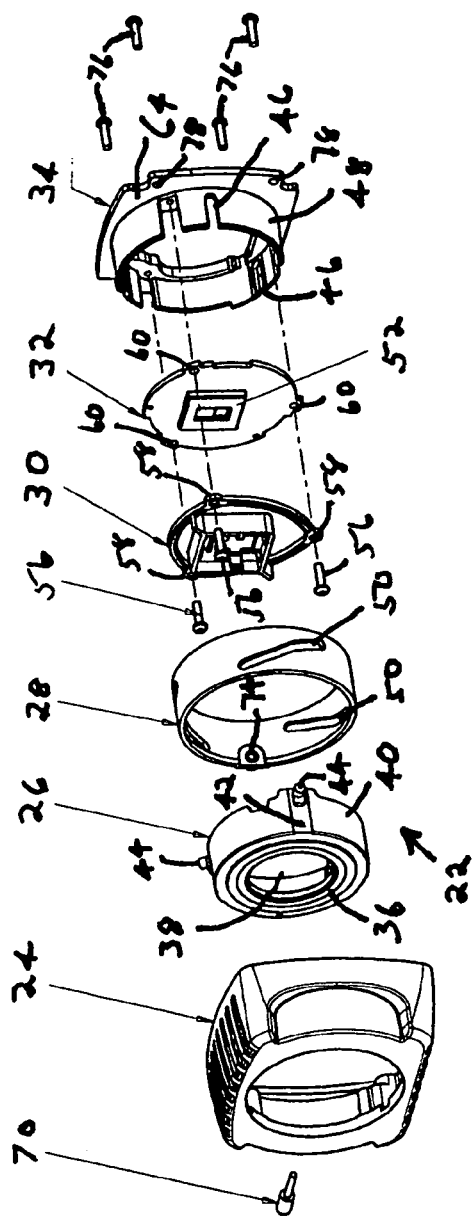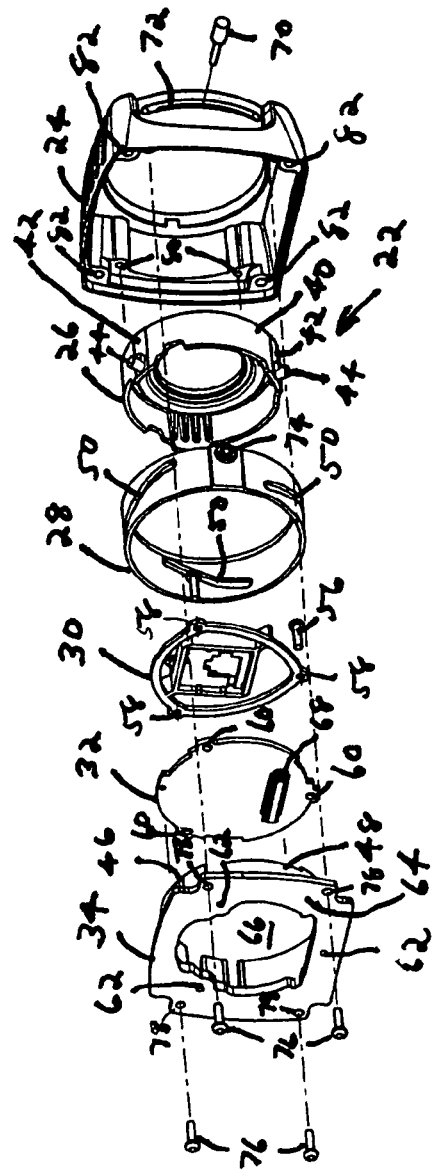

VIDEO SURVEILLANCE CAMERA

CROSS-REFERENCE TO RELATED APPLICATION

N/A

STATEMENT REGARDING FEDERALLY SPONSORED RESEARCH OR DEVELOPMENT

N/A

BACKGROUND OF THE INVENTION

The present invention relates to video surveillance cameras and, more particularly, to an assembly for adjusting the back focus of a video surveillance camera.

Video surveillance cameras must be able to provide clear and distinct images since such images may be used for security, evidentiary, identification, or other similar purposes. Present camera systems generally provide for adjustment of the back focus by moving the image sensor forward or backward while the lens stays stationary. Alternatively, for camera systems where the image sensor remains stationary, back focus is accomplished by physically adjusting the linear location of the lens assembly by screwing the lens assembly in and out of the camera body's threaded bushing. The first method is not efficient or practical for thermal management of the image sensor. The second method requires the use of tools to secure the position of the lens, which generally is not a user-friendly solution.

It is therefore desirable to provide a video surveillance camera in which the back focus can be easily adjusted and securely set. Moreover, the back focus assembly of the surveillance camera should have a minimum number of movable parts and be easy and inexpensive to manufacture, use, and maintain.

SUMMARY OF THE INVENTION

In accordance with the present invention there is provided a video surveillance camera comprising a lens, lens holder, image sensor, base, and ring. The base has a plurality of slots, and the image sensor is mounted on the base. The lens is positioned in the lens holder, which has a plurality of arms with a pin. Each of the arms is positioned so that its respective pin is located in one of the plurality of slots in the base. The ring has a plurality of grooves for engagement with the pins and is rotatably engaged with the base such that rotation of the ring imparts axial movement to the lens relative to the image sensor.

The present invention also provides an apparatus for adjusting the back focus of a camera comprising a base, lens holder, and a ring. The base has a plurality of slots and a location for mounting an image sensor. The lens holder has a plurality of arms with a pin. Each of the arms is positioned so that its respective pin is located in one of the plurality of slots in the base. The ring has a plurality of grooves for engagement with the pins and is rotatably engaged with the base such that rotation of the ring imparts axial movement to the lens holder relative to the location for mounting an image sensor. When a lens is mounted in the lens holder, the rotary input adjustment is translated into axial movement of the lens.

Among the many advantages of the present invention is the ability to adjust the back focus of a camera system without twisting or turning the camera lens while still minimizing the number of movable parts. In addition, the present invention allows the position of the lens to be easily adjusted and then securely fastened relative to the camera body. In one embodiment this function can be accomplished by using a thumbscrew that acts as a securing mechanism and as an adjustment lever. Alternatively, the adjusting ring can be motor driven. Still further, the base provides a conduit for heat removal from the image sensor. Moreover, the present invention is inexpensive to make, operate and maintain.

Other advantages and applications of the present invention will be made apparent by the following detailed description of the preferred embodiment of the invention.

BRIEF DESCRIPTION OF THE SEVERAL VIEWS OF THE DRAWINGS

FIG. 2 is an exploded front perspective view of the back focus assembly of the present invention.

FIG. 3 is an exploded back perspective view of the back focus assembly of the present invention.

DETAILED DESCRIPTION OF THE INVENTION

Figure 1:
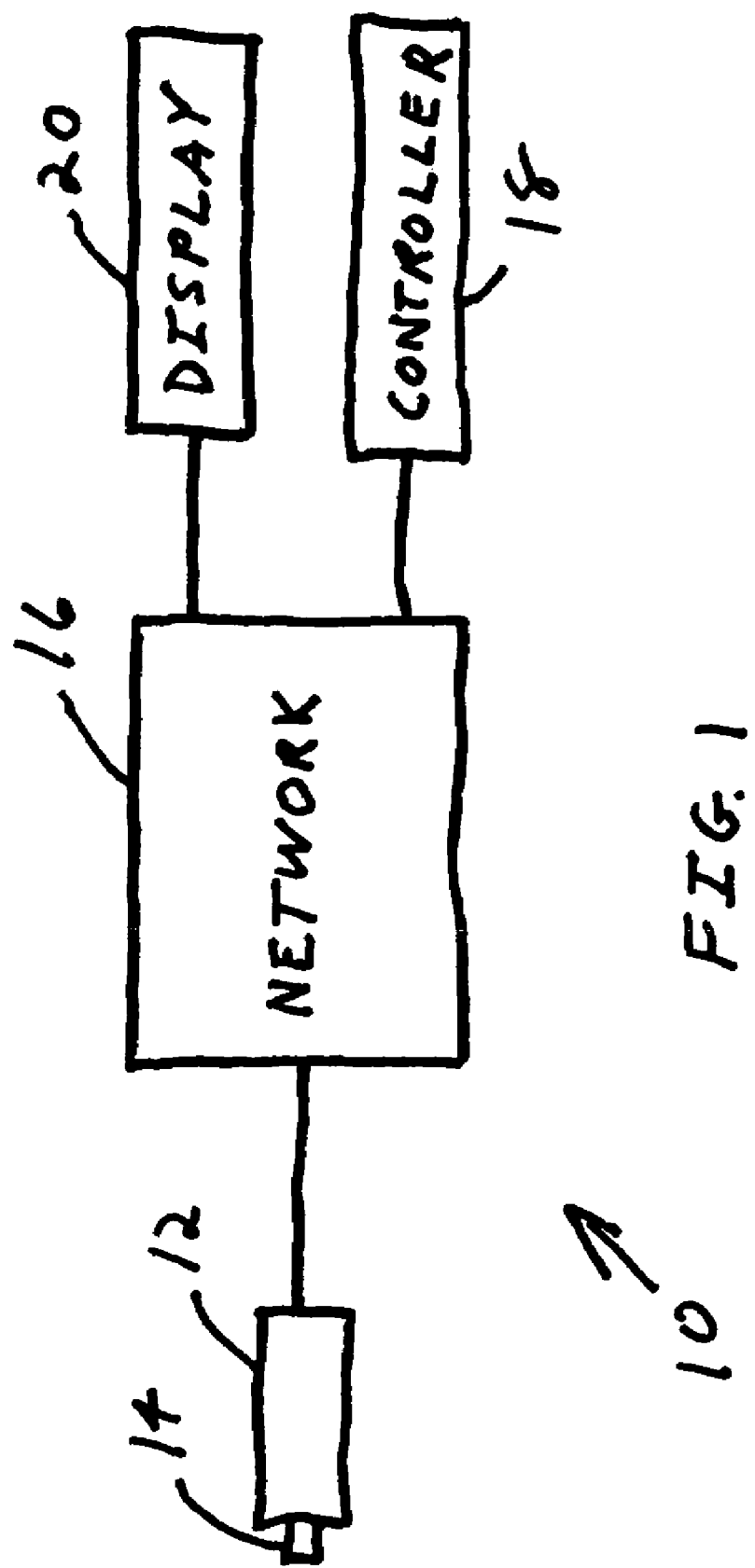
FIG. 1 is schematic block diagram of a video surveillance system utilizing the present invention.

Referring to FIG. 1, a video surveillance system 10 utilizing the present invention is shown in block diagram form. Video surveillance system 10 comprises a camera 12 having a lens 14. Camera 12 is connected to network 16, which can be a closed network, local area network, or wide area network, such as the Internet. A controller 18 is connected to network 16 to control video surveillance system 10 as is known in the art. The video images captured by camera 12 can be viewed by the user on display 20. Video surveillance system 10 can comprise a plurality of video cameras, video recorders, and other surveillance devices as is known in the art.

Referring to FIGS. 2 and 3, a back focus assembly 22 has a housing 24, lens holder 26, adjustment ring 28, filter holder 30, imager board 32, and base 34. Lens holder 26 has a front end 36 with an aperture 38 for receiving commercially available camera lenses and/or lens adaptors (not shown). Lens holder 26 is preferably a single plastic injection molded component, but may also be made of other suitable material, such as metal and/or plastic parts that are attached together. Aperture 38 may be threaded, slotted or otherwise configured to securely receive and mount a lens or lens adaptor. Lens holder 26 has an annular flange 40 with three arms 42. While three arms 42 are illustrated in the drawings, any suitable number of arms 42 may be used. Arms 42 are made of semi-flexible material so that they may bend radially inwardly relative to flange 40 during assembly of back focus assembly 22 but return to and retain their original position following assembly. One end of each arm 42 is attached to flange 40, and the opposite end is provided with a pin 44 that extends radially outwardly. Pins 44 must be of sufficient length to protrude through longitudinal slots 46 in annular flange 48 of base 34 and into angled grooves 50 of adjustment ring 28. Slots 46 are sized so that pins 44 can slide therein. During assembly, arms 42 are depressed so pins 44 can be positioned through slots 46 and into grooves 50. Once arms 42 are no longer depressed, they return to their original position and thereby maintain their position in slots 46 and grooves 50.

Imager board 32 has an image sensor 52, which can be for example, a commercially available charge-coupled device (CCD) or complementary metal oxide semiconductor (CMOS) sensor to capture the video image viewed by camera 12. Imager board 32 has a diameter slightly smaller than the inner diameter of flange 48 of base 34. Filter holder 30 and imager board 32 are fastened to base 34 by screws 56 which pass through apertures 58 in filter holder 30 and apertures 60 in imager board 32 and mate with threaded apertures 62 in the flat portion 64 of base 34 to fixedly attach imager board 32 to flat portion 64 of base 34. Flat portion 64 has an aperture 66 that permits an electrical connection to connector 68 on imager board 32. The inside diameter of flange 48 of base 34 is greater than the outside diameter of flange 40 of lens holder 26.

Adjustment ring 28 is a cylindrical tube having an inner diameter slightly larger than the outer diameter of flange 48 of base 34, allowing adjustment ring 28 to be inserted over flange 48 and slidably rotated around it. Adjustment ring 28 includes three equidistantly positioned, grooves 50 of equal length angularly traversing a portion of the circumference of adjustment ring 28 from the rear end to the front end. Grooves 50 are positioned to receive pins 44 of arms 42 of lens holder 26. Pins 44 extend through slots 46 of base 34 so that rotation of adjustment ring 28 causes grooves 50 to impart frictional pressure on pins 44. This pressure causes pins 44 to move axially within slots 46, thereby imparting axial movement to lens holder 26 relative to base 34. The direction of axial movement (retracting or extending) depends upon the direction of rotation of adjustment ring 28 (clockwise or counterclockwise). The sliding movement of pins 44 within slots 46 causes lens holder 26 to move longitudinally back and forth within flange 48 of base 34. Because slots 46 are longitudinal, they also prevent lens holder 26 from being turned, twisted or rotated as it moves in and out of base 34. Adjustment ring 28 can be a plastic injection molded part or can be made of other suitable material.

According to the present invention, the rotational movement of adjustment ring 28 translates into axial motion by lens holder 26. Since imager board 32 is in a fixed position relative to base 34, movement of lens holder 26 relative to base 34 changes the distance between the lens supported by lens holder 26 and image sensor 52, thereby allowing for changes and adjustments in the back focus. The length of grooves 50 should be sufficient to permit a full range of desired axial motion as defined by arms 42 with pins 44 in slots 46. The length of grooves 50 may be varied according to the amount of rotation of adjustment ring 28 that is desired to cause pins 44 to travel the desired length. A steeper angle will allow this axial distance to be covered with a smaller rotation of adjustment ring 28, providing a coarser adjustment of back focus. A more gradual angle will require a larger rotation of adjustment ring 28 to accomplish axial movement through the same distance, allowing for finer adjustment of the back focus. Lever 70, which can be a thumbscrew with a flattened or roughened head to allow a user to tighten and loosen lever 70 with his thumb and forefinger, is positioned through slot 72 in housing 24. Threads on one end of lever 70 mate with threaded aperture 74 in adjustment ring 28. When lever 70 is tightened, it makes contact with the surface of housing 24 to act as a securing mechanism to prevent adjustment ring 28 from rotating, thus fixing the position of lens holder 26 relative to imager board 32. When lever 70 is loosened it can be used to impart rotational movement to adjustment ring 28 to adjust the back focus as desired. Slot 72 is of sufficient length to allow lever 70 to be moved by a user to rotate adjustment ring 28 so that the full linear motion of lens holder 26 is provided to adjust the back focus. Alternatively, the mechanism for rotating adjustment ring 28 and mechanism for fixing adjustment ring 28 to prevent rotation thereof may be provided in the form of separate mechanisms.

Figure 6:
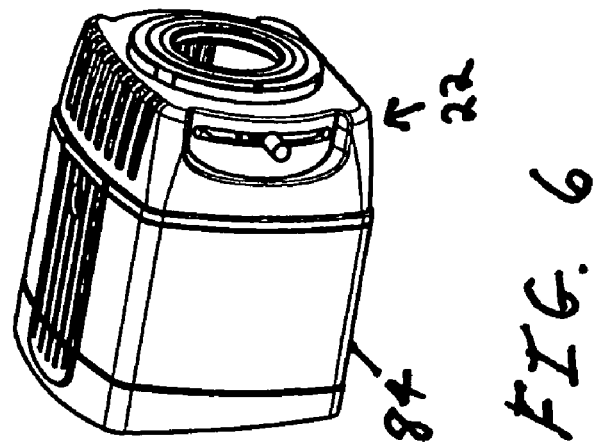
FIG. 6 is a front perspective of a video surveillance camera utilizing the present invention.
Figure 5:
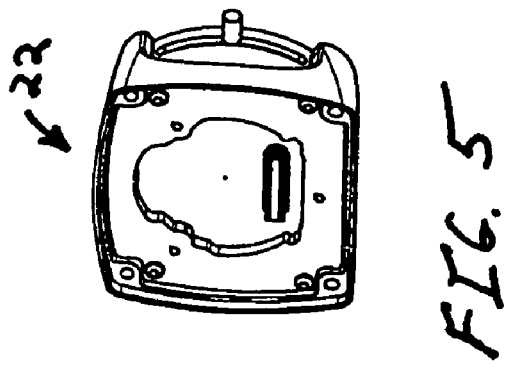
FIG. 5 is a back perspective view of the back focus assembly of the present invention.
Figure 4:
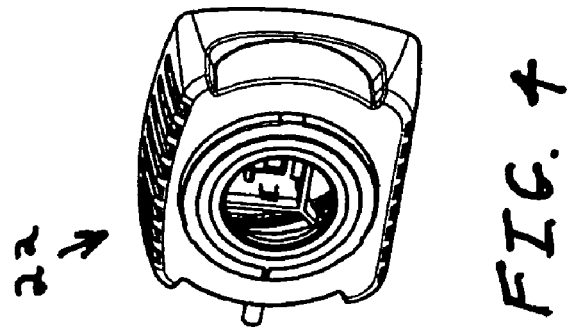
FIG. 4 is a front perspective view of the back focus assembly of the present invention.

Screws 76 are inserted through apertures 78 in flat portion 64 of base 34 and mate with threaded apertures 80 in housing 24 to securely assemble back focus assembly 22. Threaded apertures 82 in housing 24 are provided to allow attachment of back focus assembly 22 to a camera housing. Housing 24 can be a plastic injection molded part or can be made of other suitable material. FIGS. 4 and 5 show front and rear perspectives of back focus assembly 22 fully assembled. FIG. 6 illustrates back focus assembly 22 incorporated into a camera housing 84.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A video surveillance camera comprising: a lens; an image sensor; a base having a plurality of slots, said image sensor being mounted on said base; a lens holder having a plurality of arms with a pin, each of said arms being positioned so that its respective pin is located in one of said plurality of slots, said lens being positioned in said lens holder; and a ring having a plurality of grooves for engagement with said pins, said ring being rotatably engaged with said base such that rotation of said ring imparts axial movement to said lens relative to said image sensor.

2. A video surveillance camera as recited in claim 1 further comprising a securing mechanism to secure the position of said ring relative to said base.

3. A video surveillance camera as recited in claim 2 wherein said securing mechanism acts as a lever for imparting rotational movement to said ring.

4. A video surveillance camera as recited in claim 3 further comprising a housing for enclosing said lens holder, ring, and base, wherein said housing has a slot and said securing mechanism extends through said slot.

5. A video surveillance camera as recited in claim 4 wherein said securing mechanism is a thumbscrew.

6. A video surveillance camera as recited in claim 5 wherein said ring has a threaded aperture and said thumbscrew has threads that mate with said threaded aperture.

7. A video surveillance camera as recited in claim 1 wherein said lens holder comprises a first annular flange and said base comprises a second annular flange, said slots being located in said second annular flange and the diameter of said first annular flange being less than the diameter of said second annular flange.

8. A video surveillance camera as recited in claim 7 further comprising an imager board attached to said base inside said second annular flange and said image sensor being attached to said imager board.

9. An apparatus for adjusting the back focus of a camera comprising: a base having a plurality of slots and a location for mounting an image sensor; a lens holder having a plurality of arms with a pin, each of said arms being positioned so that its respective pin is located in one of said plurality of slots; and a ring having a plurality of grooves for engagement with said pins, said ring being rotatably engaged with said base such that rotation of said ring imparts axial movement to said lens holder relative to said location for mounting an image sensor.

10. An apparatus as recited in claim 9 further comprising a securing mechanism to secure the position of said ring relative to said base.

11. An apparatus as recited in claim 10 wherein said securing mechanism acts as a lever for imparting rotational movement to said ring.

12. An apparatus as recited in claim 11 further comprising a housing for enclosing said lens holder, ring, and base, wherein said housing has a slot and said securing mechanism extends through said slot.

13. An apparatus as recited in claim 12 wherein said securing mechanism is a thumbscrew.

14. An apparatus as recited in claim 13 wherein said ring has a threaded aperture and said thumbscrew has threads that mate with said threaded aperture.

15. An apparatus as recited in claim 9 wherein said lens holder comprises a first annular flange and said base comprises a second annular flange, said slots being located in said second annular flange and the diameter of said first annular flange being less than the diameter of said second annular flange.

16. An apparatus as recited in claim 15 further comprising an imager board attached to said base inside said second annular flange and said image sensor being attached to said imager board.

* * * * *